United States Patent
Azvine et al.

(10) Patent No.: US 6,779,060 B1
(45) Date of Patent: Aug. 17, 2004

(54) MULTIMODAL USER INTERFACE

(75) Inventors: Behnam Azvine, Suffolk (GB); Kwok Ching Tsui, Colchester (GB); Christos Voudouris, Suffolk (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 09/743,320

(22) PCT Filed: Aug. 5, 1999

(86) PCT No.: PCT/GB99/02577
§ 371 (c)(1),
(2), (4) Date: Jan. 9, 2001

(87) PCT Pub. No.: WO00/08547
PCT Pub. Date: Feb. 17, 2000

(30) Foreign Application Priority Data

Aug. 5, 1998 (EP) ............................................ 98306262

(51) Int. Cl.$^7$ ............................................... G06F 3/00
(52) U.S. Cl. .............................. 710/65; 710/11; 710/14; 710/37; 710/50; 710/73
(58) Field of Search .............................. 710/11, 14, 37, 710/50, 65, 73

(56) References Cited

U.S. PATENT DOCUMENTS

| | | | |
|---|---|---|---|
| 5,265,014 A | | 11/1993 | Haddock et al. |
| 5,577,165 A | * | 11/1996 | Takebayashi et al. ........ 704/275 |
| 5,701,400 A | * | 12/1997 | Amado ......................... 706/45 |
| 5,748,974 A | * | 5/1998 | Johnson ......................... 704/9 |
| 5,777,614 A | * | 7/1998 | Ando et al. .................. 345/729 |
| 5,781,179 A | | 7/1998 | Nakajima et al. |
| 5,884,294 A | * | 3/1999 | Kadar et al. ................... 706/10 |
| 5,963,911 A | | 10/1999 | Walker et al. |
| 6,021,403 A | * | 2/2000 | Horvitz et al. ................ 706/45 |
| 6,209,788 B1 | * | 4/2001 | Bridgelall et al. ...... 235/462.32 |
| 6,345,111 B1 | * | 2/2002 | Yamaguchi et al. ......... 382/118 |
| 6,438,523 B1 | * | 8/2002 | Oberteuffer et al. ........ 704/270 |
| 6,578,005 B1 | | 6/2003 | Lesaint et al. |

FOREIGN PATENT DOCUMENTS

| | | |
|---|---|---|
| EP | 0589754 A | 3/1994 |
| EP | 0720090 A | 7/1996 |
| EP | 1 101 160 B1 | 5/2001 |

OTHER PUBLICATIONS

Microsoft, "Microsoft Computer Dictionary", Microsoft Press, Fifth Edition, p. 230—definition of "fuzzy logic".*
Tsui et al, Intelligent Multu–Modal Systems, BT Technology Journal, vol. 16, No. 3, Jul. 1998, pp. 134–144.
Patent Abstracts of Japan, vol. 98, No. 12, Oct. 31, 1998 & JP 10 198544 A (Toshiba Corp.), Jul. 31, 1998.
Barro et al, "A Model and A Language For the Fuzzy Representation and Handling of Time", Fuzzy Sets and Systems, vol. 61, No. 2, Jan. 24, 1994, pp. 153–175.

* cited by examiner

*Primary Examiner*—Jeffrey Gaffin
*Assistant Examiner*—Niketa Patel
(74) *Attorney, Agent, or Firm*—Nixon & Vanderhye P.C.

(57) ABSTRACT

In a multi-modal user interface, user inputs may be made in various different ways. For instance, the user might use a keyboard, a speech system, a vision system, a mouse or pen. Different inputs made by the user may be related and may have different significance. A processing system detects and resolves ambiguities and/or conflicts in inputs made by the user using the different input modes available.

11 Claims, 8 Drawing Sheets

If $\delta_b$ is negative then A has occurred *before* B, } 6a

If $\delta_b$ is zero then A has occurred *just before* B, } 6b

If $\delta_b$ is positive and $\delta_c$ is positive or zero then A has occurred *during* B, } 6c If $\delta_s$ is zero and $\delta_c$ is zero then A has occurred *at the same time as* B, } 6d If $\delta_b$ is positive or zero and $\delta_c$ is negative then A *overlaps with* B, } 6e

Fig.7.

PI Membership Function Representing Fuzzified 1

MULTIMODAL USER INTERFACE

BACKGROUND

1. Technical Field

The present invention relates to a multimodal user interface for a data or other software system. The interface finds particular application in resolving insufficient inputs to a multimodal system.

2. Description of Related Art

Man-to-machine communications is a major business opportunity. The rapid growth in the use (and processing power) of computers both in the home and in the workplace is leading to the situation where the market for "man-machine traffic" is growing fast. Machine Intelligence (MI) looks likely to provide the basis for a plethora of new service offerings, not only for the world of business but also for the domestic user of telecommunications.

In many industries, information technology (IT) systems are replacing secretaries, the word processor and E-mail, and now electronic agents are often the new personal assistant—not people. This acceptance of software will accelerate the race to develop intelligent machines.

Intelligent software is applicable in situations where the combination of human and current computer technology is either too slow, too expensive or under strain. The following examples indicate where machine intelligence is likely to have a beneficial impact in the years to come: communications filtering, telephone answering, resource management, network management and managers' assistance.

Research in human-computer interactions has mainly focused on natural language, text, speech and vision primarily in isolation. Recently there has been a number of research projects that have concentrated on the integration of such modalities using intelligent reasoners. The rationale is that many inherent ambiguities in single modes of communication can be resolved if extra information is available. A rich source of information for recent work in this area is the book entitled *Intelligent User Interfaces* by Sullivan and Tyler [Addison Wesley 1991]. Among the projects reviewed in the above reference are CUBRICON from Calspan-UB Research Centre, XTRA from German Research Centre for AI and the SRI system from SRI International.

The CUBRICON system is able to use a simultaneous pointing reference and natural language reference to disambiguate one another when appropriate. It also automatically composes and generates relevant output to the user in co-ordinated multi-media. The system combines natural language, text commands, speech and simulated gestures such as pointing with a mouse. The application area is military-based maps.

The XTRA system is an intelligent multi-modal interface to expert systems that combines natural language, graphics and pointing. It acts as an intelligent agent performing a translation between the user and the expert system. The most interesting aspect of this project is how free form pointing gestures such as pointing with fingers at a distance from the screen has been integrated with graphics and natural language to allow a more natural way of communication between the user and the expert system.

The SRI system combines natural language/speech with pen gestures such as circles and arrows to provide map-based tourist information about San Francisco.

At the heart of all above systems is a reasoner that combines the general and task-specific knowledge in its knowledge base with often vague or incomplete user requests in order to provide a complete query to the application.

To a communications company, provision of service to business and residential customers, network maintenance and fault repair are core activities of a workforce which can involve thousands of technicians every day. A fully automated system called Work Manager has been developed for managing the workforce. This is described for instant in U.S. Pat. No. 5,963,911, the content of which is herein incorporated by reference. Work Manager is capable of monitoring changes in resource and work profiles, and of reacting to them when necessary to maintain the feasibility and optimality of work schedules. An important component is the allocation algorithm called Dynamic Scheduler. The purpose of the Dynamic Scheduler is to provide the capability:

- to schedule work over a long period of time,
- to repair/optimise schedules,
- to modify the business objectives of the scheduling algorithms, and
- to provide statistics from which the schedules can be viewed and their quality assessed.

The Dynamic Scheduler is described in U.S. Pat. No. 6,578,005, the content of which is also herein incorporate by reference.

The user interface can be very important in systems like the Dynamic Scheduler, including data visualisation for the user interface. Enormous amounts of information can be produced, making the assessment of results via traditional management information systems extremely difficult. Data visualisation can summarise and organise the information produced by such systems, for instance facilitating real-time monitoring and visualisation of work schedules generated, but the sheer magnitude of information available today often makes the interface between humans and computers very important.

BRIEF DESCRIPTION OF EXEMPLARY EMBODIMENTS

According to the present invention there is provided a multimodal user interface for receiving user inputs in more than one different mode, the interface comprising:

i) at least two inputs for receiving user communications in a different respective mode at each input;

ii) an output to a system responsive to user communications; and iii) processing means for resolving ambiguity and/or conflict in user communications received at one or more of the inputs.

A user input mode can be determined primarily by the tool or device used to make the input. A mode (or modality) is a type of communications channel e.g. speech and vision are two modalities. Within the context of the embodiments of the present invention described below, there are four input modalities: keyboard, mouse, camera and microphone. Everything originating from each of these devices has the same mode e.g. the keyboard provides one mode of communication whether it is used for free text input or specific selections. However, in a different system, different modes might also encompass different usage of the same tool or device. For instance, a keyboard might be used for free text input while its tab key might be used as the equivalent of a mouse; in a different embodiment, this might actually constitute two different modes.

Preferred embodiments of the present invention allow modes with very different characteristics at the interface to be used, such as gaze tracking, keyboard inputs and voice recognition. These can take very different lengths of time to achieve an input and pose very different problems for a system in terms of accessing content in an input, to a sufficient degree of accuracy to act on it reasonably correctly.

For instance, there can be significant uncertainty in the timing of events. That is, the start and end time of mouse or camera events could be fuzzy and the relationship between the starts and ends of two events could also be fuzzy (positive or negative). Therefore the temporal relationship established on the basis of these relationships is fuzzy too.

Embodiments of the present invention can provide a particularly flexible system which can handle approximate timings of events of several different types. This property offers an important level of tolerance to the inherent variability with which multiple users operate a system.

An important aspect of embodiments of the present invention is the temporal reasoner. Such a temporal reasoner could be used with other environments than a multimodal interface for human users since there may be other requirements for measuring temporal separation to determine a relationship between events having start and end times. The temporal reasoner can be broadly expressed as follows, together with the method it carries out.

A temporal reasoner comprising:
  i) means for receiving start and end time data for a pair of events,
  ii) means for calculating temporal separation of the start times and the end times for said pair,
  iii) means for applying a broadening function to each calculated temporal separation,
  iv) means to categorise each broadened temporal separation into preselected categories, and
  v) means to determine whether the pair of events is related or not related, based on the resultant categories for the broadened temporal separations.

This temporal reasoner can be used in an interface for receiving inputs having start and end times, the pair of events comprising two such inputs, the interface comprising means for measuring the start and end times of the two inputs to provide the start and end time data to the temporal reasoner. Further, said categories may usefully comprise negative, zero and positive, as described above for the multimodal interface.

A method of temporal reasoning can be described as comprising:
  i) receiving start and end time data for a pair of events,
  ii) calculating temporal separation of the start times and the end times for said pair,
  iii) applying a broadening function to each calculated temporal separation,
  iv) using rules to categorise each broadened temporal separation into preselected categories, and
  v) using further rules to determine whether the pair of respective user communications is related or not related, based on the resultant categories for the broadened temporal separations.

BRIEF DESCRIPTION OF DRAWINGS

A multimodal interface according to an embodiment of the present invention will now be described, by way of example only, with reference to the accompanying Figures in which.

DETAILED DESCRIPTION OF EXEMPLARY EMBODIMENTS

The multimodal interface described below is particularly adapted for the Work Manager with Dynamic Scheduler system mentioned above.

Figure 1:
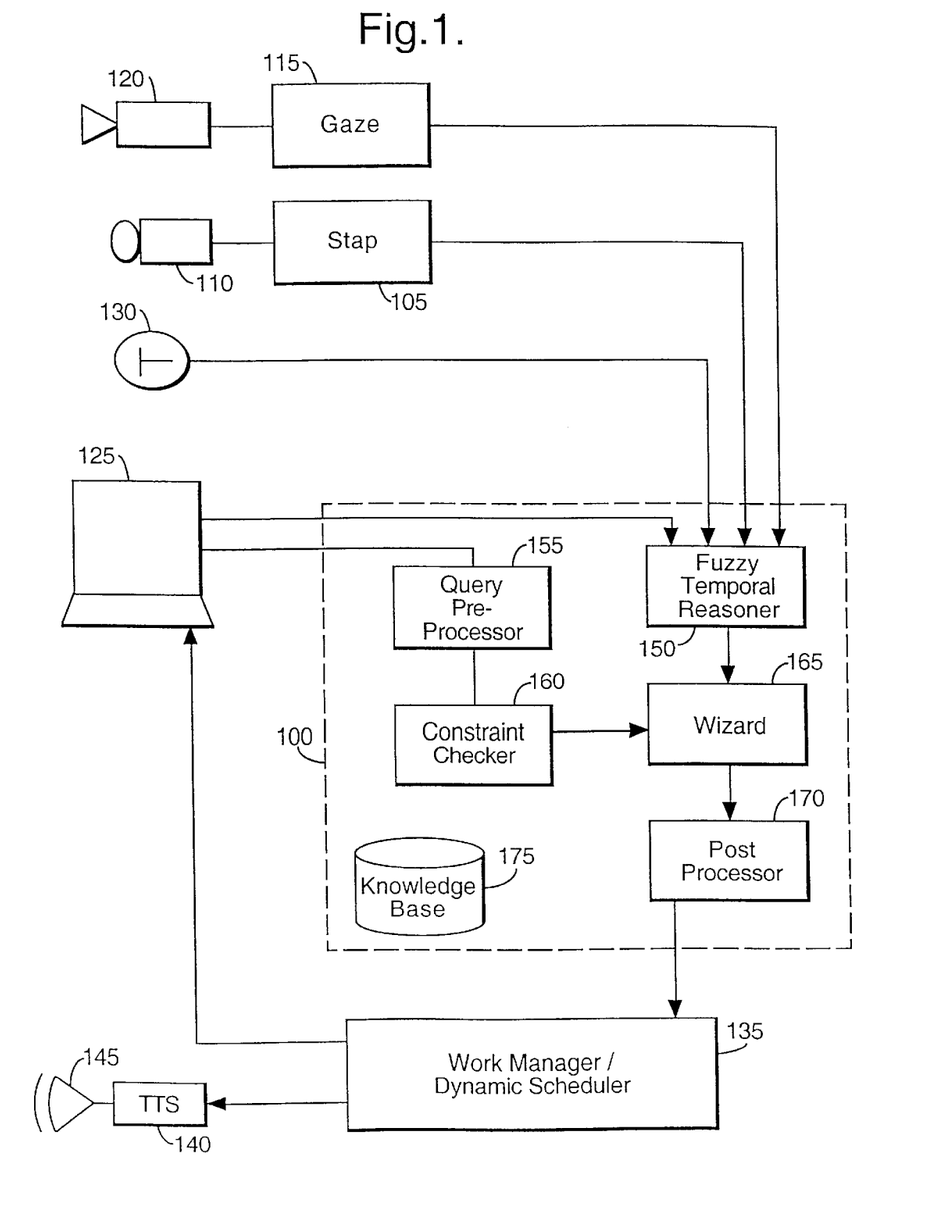
FIG. 1 shows schematically the main components of the interface.

Referring to FIG. 1, the main characteristics of the multimodal interface for this system, known altogether as the "Smart Work Manager", are that it can process any of:
  speech
  text
  face images
  gaze information
  simulated gestures using the mouse as input modalities, and its output is in the form of speech, text or graphics. The main components of the system are the various inputs, including a speech system 105, 110, a vision system 115, 120, a graphical user interface with keyboard 125 and a mouse or pen 130, a reasoner 100 for resolving inputs and an interface to one or more applications 135. The applications 135 to which the application interface relates within the Smart Work Manager are the Work Manager and the Dynamic Scheduler. The applications 135 in turn have access to a text to speech system 140, 145 and to the graphical user interface 125, in order to output reports and queries for the user.

APPLICATIONS: WORK MANAGER AND THE DYNAMIC SCHEDULER

The input modes which the multimodal interface is required to deal with are determined by the requirements of the applications 135. The following is therefore a description of the functionality of the applications, and of the inputs a user has at their disposal.

The applications 135 Work Manager and the Dynamic Scheduler, are concerned with the utilisation of resources, such as technicians, in performing a number of jobs or tasks. An initial series of schedules is generated in a two-stage process. First a rule-based system allocates tasks which have been selected as being difficult to allocate, for example because they are linked to other tasks, and then a stochastic search system compiles the rest of the schedule. The stochastic system may be interrupted to allow a further rule-based system to analyse schedules created thus far, and to fix the best ones in an overall schedule, so that the stochastic system can concentrate upon improving the remaining schedules. Rapid and/or real time changes in requirements, tasks and resources are accommodated by a schedule modification system.

It is the Dynamic Scheduler in particular which selects the "difficult-to-allocate" jobs and applies the rule-based approach to schedule these jobs first and the stochastic approach to schedule other tasks around those already fixed. Each time a technician becomes available and requests a further job, the Dynamic Scheduler reviews all remaining tasks, even those already allocated to other technicians, and selects one for allocation to the requesting technician based simply on urgency. This prevents urgent tasks remaining undone when the technician to whom they were scheduled unexpectedly remains unavailable.

To facilitate the process, the Dynamic Scheduler is provided with a rule-based scheduler and a stochastic scheduler, an on-line allocator and a data visualiser. A number of stochastic techniques are known in the art for generating near-optimal solutions to multi-dimensional problems such as the one specified by the Dynamic Scheduler. Several of these are discussed in the article "Stochastic Techniques for Resource Management" by Brind, Muller & Prosser in the BT Technology Journal Volume 13 No. 1 (January 1995). In particular, this article describes the techniques known as "Hill Climbing", Simulated Annealing", "Tabu Search" and Genetic Algorithms". The choice of which technique is best suited to a particular circumstance depends on the nature of the problem. For speed of operation and robustness on both under- and over-resourced problems, the Simulated Annealing technique is preferred for use in the stochastic scheduler of the Dynamic Scheduler.

The Dynamic Scheduler in this respect has three inputs. Firstly, there is an input for a set of tours for the technicians that are available, produced by a pre-scheduler. (In an alternative arrangement, the pre-scheduler may be omitted and the tours include only fixed points set by a pre-processor). Secondly, there is an input for the details of available technicians. Thirdly, there is an input for the details of unscheduled tasks (i.e. those not selected by the pre-processor for scheduling).

The function of the stochastic scheduler is to produce a set of tours for the technicians which minimises an objective cost function. The final tours are produced by making one change at a time to the current schedule, using a single modifying operator, and then stored.

A user of the Dynamic Scheduler works with the data visualiser to interact with the Dynamic Scheduler and it is here that the multimodal interface of the present invention is particularly relevant.

GRAPHICAL USER INTERFACE: DATA VISUALISATION

Data visualisation is an essential component of the Dynamic Scheduler. The Dynamic Scheduler produces enormous amounts of information making the assessment of results via traditional management information systems extremely difficult. Data visualisation summarises and organises the information produced by the Dynamic Scheduler, facilitating the real-time monitoring of work schedules generated.

Figure 2:
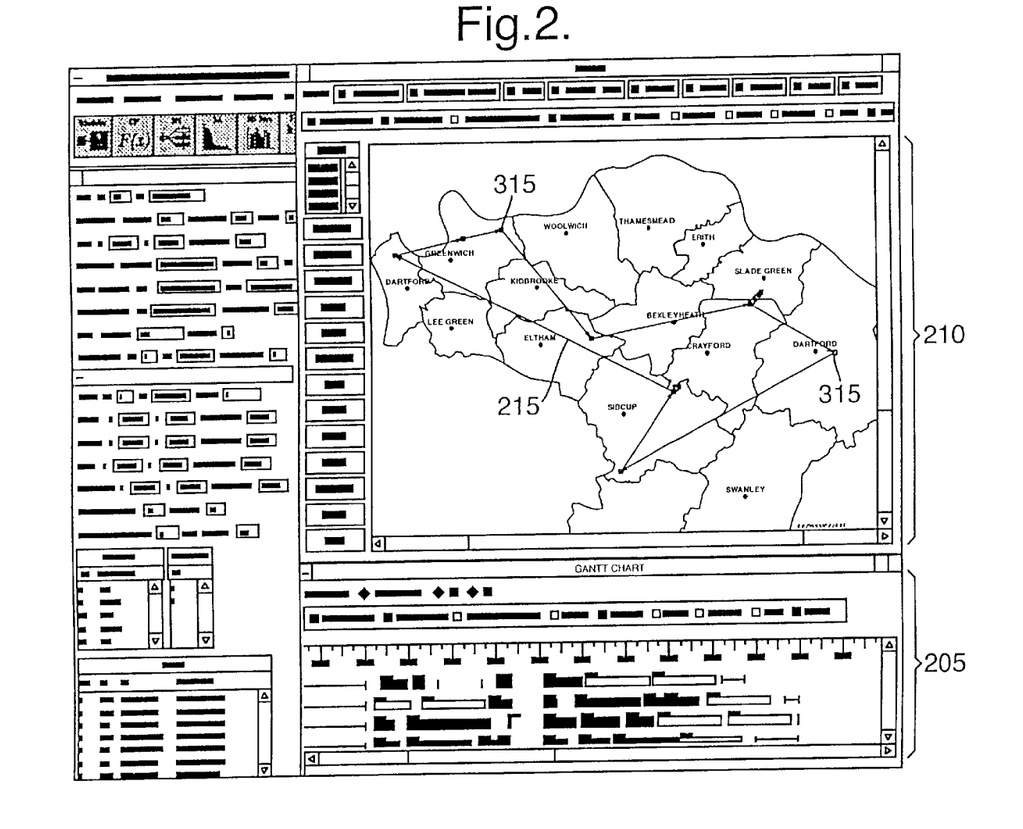
FIGS. 2 and 3 show examples of screen views shown by a data visualiser during use of the interface.
Figure 3:
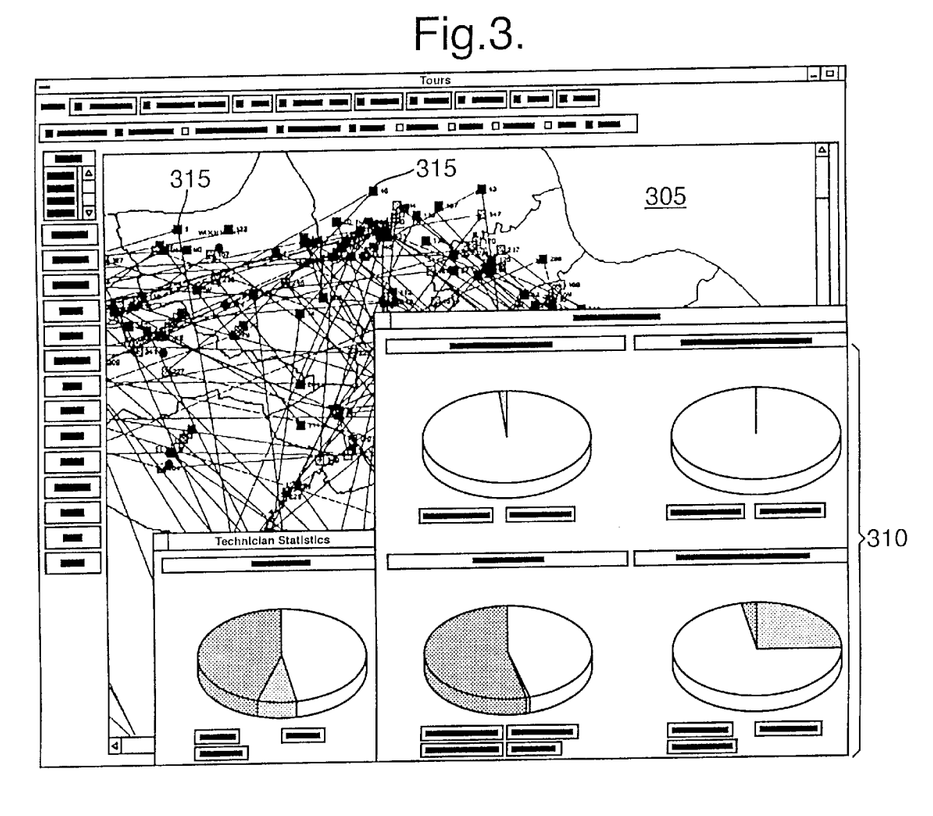

Referring to FIGS. 2 and 3, both the temporal and spatial dimensions of the information produced can be visualised on a visual display unit (VDU).

Temporal information is organised in a Gantt chart 205 which places technician actions (e.g. tasks, travel, absences) in timelines, one for each technician. These timelines may extend from a few hours up to many days ahead providing the necessary degree of visibility over the allocation of work.

Spatial information is presented on a geographical map 210, 305 of the area in which the Dynamic Scheduler system is operating. Apart from useful landmarks and geographical boundaries, the locations 305 of tasks, absences etc. are displayed. The technician tours are shown as sets of task locations 315 with lines joining them up, each set of task locations being those allocated to a single technician. FIG. 2 shows a single technician tour 215, representing one technician's work period. The status of a task is represented by markings on the box shown at the task location 315. For instance, unallocated tasks might be shown cross-hatched instead of black for an allocated task.

Technician tours can be viewed or even animated for selected periods of the schedule.

Various information filters may be applied allowing the user to focus on specific aspects of the schedule (e.g. important tasks, unallocated tasks). Additionally, data visualisation can provide access to detailed task and technician information, statistics in the form of pie-charts 310, bar-charts, and graphs (not shown) which make the evaluation of schedules easier, and various controls for assessing and improving the performance of the scheduling engine to meet the business goals.

FIGS. 2 and 3 show just some of the information which can be displayed by the Data Visualiser.

QUERYING THE DATA VISUALIZATION TOOL

The Data Visualiser is driven by mouse clicks, keyboard input for instance for setting parameters, voice recognition and by a gaze tracking system which detects where a user is looking on the VDU. There is a need to design a formal language of interaction that will enable the user to communicate with the interface and execute operations. Below, a typical session is shown where the user performs a sequence of operations: access of data, execution of the scheduler, visualisation of the results:

[load a scenario first]
load current scenario

[queries on the scheduling algorithm]
give me the cost function
set travel penalty to 60

[a scheduling on the scenario]
run scheduler

[general queries on the scenario]
give me the number of jobs of the scenario
the number of technicians
give the general travel factor

[general queries on the schedule]
give me the start time of the schedule
its duration
give me the number of allocated jobs
unallocated jobs

[schedule analysis phase starts]
display technician tours in the gantt chart
display technician tours on the map

[technician schedule analysis loop]
display technician 2 jobs in the map/gantt chart

[technician job analysis loop]
which job is this? [pointing/looking at the map/gantt chart]
give me its temporal category
its earliest start time
its location
give me the technician's journeys in the map
give me its jobs in the map
which job is this?
give me its importance score
its cost
. . .
give me tech 4 in the gantt chart
. . .

[schedule stats analysis]
give me the heuristics of the schedule
give me the average travel time
the average idletime
the KPIs

[changes to the cost function]
set unallocated job penalty to 0

[a new scheduling]
re-run
. . .

(It should be noted that certain aspects of the above session, such as general travel factor, temporal category and importance score, are characteristics of the Dynamic Scheduler and can be understood on reading the description thereof set out in U.S. Pat. No. 6,578,005 referenced above. A "scenario" is a command issued to the scheduling algorithm to load a set of parameters. A "KPI" is a Key Performance Indicator. Again these are parameters related to the scheduling algorithm and are not a part of the user interface of the present invention. The phrase "print KPIs of schedule" is simply treated as a command by the interface.)

As the above "script" illustrates, the set of actions/queries during a complete session can be decomposed into three classes:

queries on scenario and schedule based on textual information display,
queries on scenario and schedule based on the gantt chart 205 and the map 210, 305,
queries on the scheduling algorithms.

In the following, these queries are abstracted and factorised by defining a grammar for each class.

QUERIES ON SCENARIO AND SCHEDULE BASED ON TEXTUAL INFORMATION DISPLAY

The grammar for these queries is defined as follows:
order/question+object_class+object_identifier+object_attribute or order/question+object_attribute+of+object_class+object_identifier Examples
give me job 3 start location.
what is the start location of technician 1 2 3.
print KPIs of schedule.

The full definition of the grammar is given by the table 1. Each row in the table determines a set of queries. For instance, the third line of the first row represents the following queries:

give technician X start location
give technician X end location
give technician X start location of absence
give technician X end location of absence
display technician X start location
display technician X end location
display technician X start location of absence
display technician X end location of absence where X is a technician identifier.

To simplify, technician and job identifiers will all be defined by three digits (d represents a digit).

TABLE 1

The full definition of text-based queries

| ORDER/ QUESTION | OBJECT CLASS | OBJECT ID | OBJECT ATTRIBUTE | OBJECT ATTRIBUTE |
|---|---|---|---|---|
| give/display | technician | ddd | start/end/ duration of expected completion time start/end current location daily overtime/ first travel/last travel | day/lunch/ absence location/ location of absence budget |
| | job | ddd | temporal/link location earliest/latest primary/ secondary duration importance score | category start time target |
| | scenario | { } | date number of general travel factor min_percent_ on_site | technicians/ jobs |
| | schedule | { } | start/end duration number of duration/ travel time average KPIs cost function heuristics | time days/technicians/ jobs allocated/jobs unallocated per job travel time/overtime/ idle-time |

QUERIES ON SCENARIO AND SCHEDULE BASED ON THE GANTT CHART AND THE MAP

The grammar for these queries is defined as follows:

order/question+object_class−object_identifier+object_attribute+object_situation or order/question+object_attribute+of+object_class+object_identifier Examples     give me job 0 1 3position in the gantt chart.
    display technician 1 2 3 tour on the map.

TABLE 2

The definition of queries for Map/Gantt chart

| ORDER | CLASS | ID | ATTRIBUTE | SITUATION |
|---|---|---|---|---|
| give/ display | technician | ddd | jobs/journeys/breaks/home breaks/lunch breaks/tour/cost | in map/in gantt chart |
|  | job | ddd | position/breaks/travel time/duration/cost | in map/in gantt chart |
|  | schedule | { } | tours/unallocated jobs/allocated jobs | in map/in gantt chart |

QUERIES ON THE SCHEDULER

These queries are not easily factorable. Therefore, the table is essentially a list of queries instead of a tree-structured grammar.

TABLE 3

The definition of Grammar for Scheduler

| ORDER | ATTRIBUTE | OBJECT | VALUE |
|---|---|---|---|
| Load | Current | scenario | { } |
| run from | current/best | schedule | { } |
| re-run | { } | { } | { } |
| Set | travel/unallocated job/... | penalty to | number |

It is worth noting that the sequence of queries during a session is not random but follows specific patterns. Globally, we should expect a user to implement the following plan of actions:

load a scenario first
  tune the control parameters of the scheduling algorithm
  run the scheduler on the scenario
    access scenario data
    access schedule data
    analyse the schedule
      analyse individual technician schedule
        analyse jobs in technician schedule
      analyse schedule statistics.
  re-tune the scheduler's control parameters
  run the scheduler again
load another scenario This plan is hierarchical: for instance, to analyse the schedule, the user analyses the schedule of several technicians and to analyse each technician schedule, the user analyses the allocation of several jobs. This hierarchical structure can be used in embodiments of the present invention to support contextual reasoning to reduce the work load on the user. For instance, when the user accesses data related to a job [stage: analyse jobs in technician schedule], the context in which this job is analysed—technician, scenario, parameter setting—is completely known and is valid for as long as the job analysis continues. It is not therefore essential that the user enters contextual data in order to make a query of the scheduler at this stage.

Embodiments of the present invention are intended, by including a reasoner, to allow the user to make incomplete and/or ambiguous entries and still to receive a valid response to a query. This is enabled by the system using contextual data, stored or input by a user, to complete a sufficient query to submit to the relevant application, in this case the Dynamic Scheduler.

RESOLVING AMBIGUITY USING THE REASONER

The main objective of the reasoner can be stated as follows:

Given a sentence which complies with a pre-defined grammar, convert it to a valid command for the application. The grammar is the grammar for querying the data visualisation tool described above and the application in this case will be the Dynamic Scheduler which actually holds the data which the visualiser needs in order answer the user's query. The main problems solved by the reasoner are two fold. First it must be able to handle ambiguities such as give me this of that. Second it must have the capabilities to deal with conflicting information arriving from various modalities. The capabilities of the reasoner are to a large extent dependent upon the capabilities provided by the platform on which the reasoner is implemented. The platform used for the reasoner is CLIPS, which is a known expert system shell developed by NASA with object oriented, declarative and procedural programming capabilities and the fuzzyCLIPS extension. The reasoner can handle at least some ambiguities by using a knowledge base which is being continually updated by the information arriving from various modalities.

Referring to FIG. 1, there are five processing modules in the reasoner 100: fuzzy temporal reasoning 150, query pre-processing 155, constraint checking 160, resolving ambiguities (WIZARD) 165, and post-processing 170.

There is also the knowledge base 175 to which any of the processing modules has access as necessary. The knowledge base contains facts and rules. Facts are pieces of information that are added and deleted dynamically and is the way the reasoner 100 gets information from the external world i.e. modalities. The rules operate on facts to arrive at conclusions e.g. IF there are no mouse clicks THEN ask the user.

The fuzzy temporal reasoning module 150 receives time-stamped events from various modalities and determines the fuzzy temporal relationship between them. It determines to what degree two events have a temporal relationship, such as before, during or overlapping. This temporal relationship can be used later by the reasoner to resolve conflicts between, and checking dependency of, the modalities.

In the query pre-processing module 155 a sentence in natural language form is converted to a query which conforms to the system's pre-defined grammar. Redundant words are removed, key words are placed in the right order and multiple word attributes are converted into single strings.

The constraint checking module 160 examines the content of the queries. If individual parts of the query do not satisfy pre-defined constraints then they are replaced by reserved words (this, that, missing) to be resolved later, otherwise the query is passed on to the next module. The constraints include a check for valid combinations of attributes and objects. For example, end of day is a valid attribute for a technician but not for a job, and location is valid for a job but not for a technician.

Figure 4:
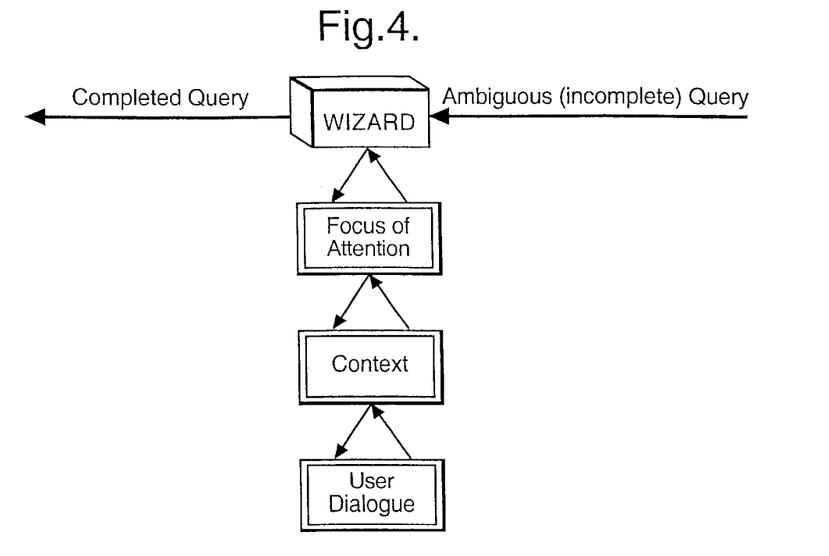
FIG. 4 shows a hierarchy of factors taken into account in resolving ambiguities in use of the interface.

The WIZARD 165 is at the heart of the reasoner 100 and is the module that resolves ambiguities. The ambiguities in this application take the form of reserved words such as this or that, and they refer to objects that the user is or has been talking about, pointing at or looking at. Referring to FIG. 4, the ambiguities are resolved in a hierarchical manner. The focus of attention has the highest priority and the dialogue system the lowest. This means that the dialogue system will usually be redundant but will act as a safety net for the other modalities if all fails, or if inconsistent information is received from the modalities. In cases where text input is required however, the dialogue system is the only modality which will be called upon.

The post-processing module 170 simply converts the completed queries into a form suitable for querying the Dynamic Scheduler application. This involves simple operations such as formatting the query or extracting key words from it.

Referring again to FIG. 1, the reasoner 100 starts in a "wait" state until any of the input modalities is active. When an input modality, such as the visual system 115, 120, detects an activity, it generates an event and sends it to the fuzzy temporal reasoner 150. The fuzzy temporal reasoner 150, for all the modalities, time stamps incoming events and adds the events to working memory.

The primary input modalities are the keyboard and speech. They capture the command the user issues. The mouse and gaze systems 130, 115, 120 provide supplementary information to the reasoner when ambiguities in the user command regarding object reference need to be resolved. Hence, on receipt of an input by means of the mouse or gaze systems, the reasoner looks for an incomplete command for the user via keyboard or speech. An incomplete command may already have been received and require the mouse/gaze input to resolve an ambiguity, or an incomplete command may just be about to be received. Therefore, on receipt of a mouse/gaze input, from the user, but with no other input, the system will await an incomplete command via the keyboard or speech for resolution by the mouse/gaze input.

Figure 5:
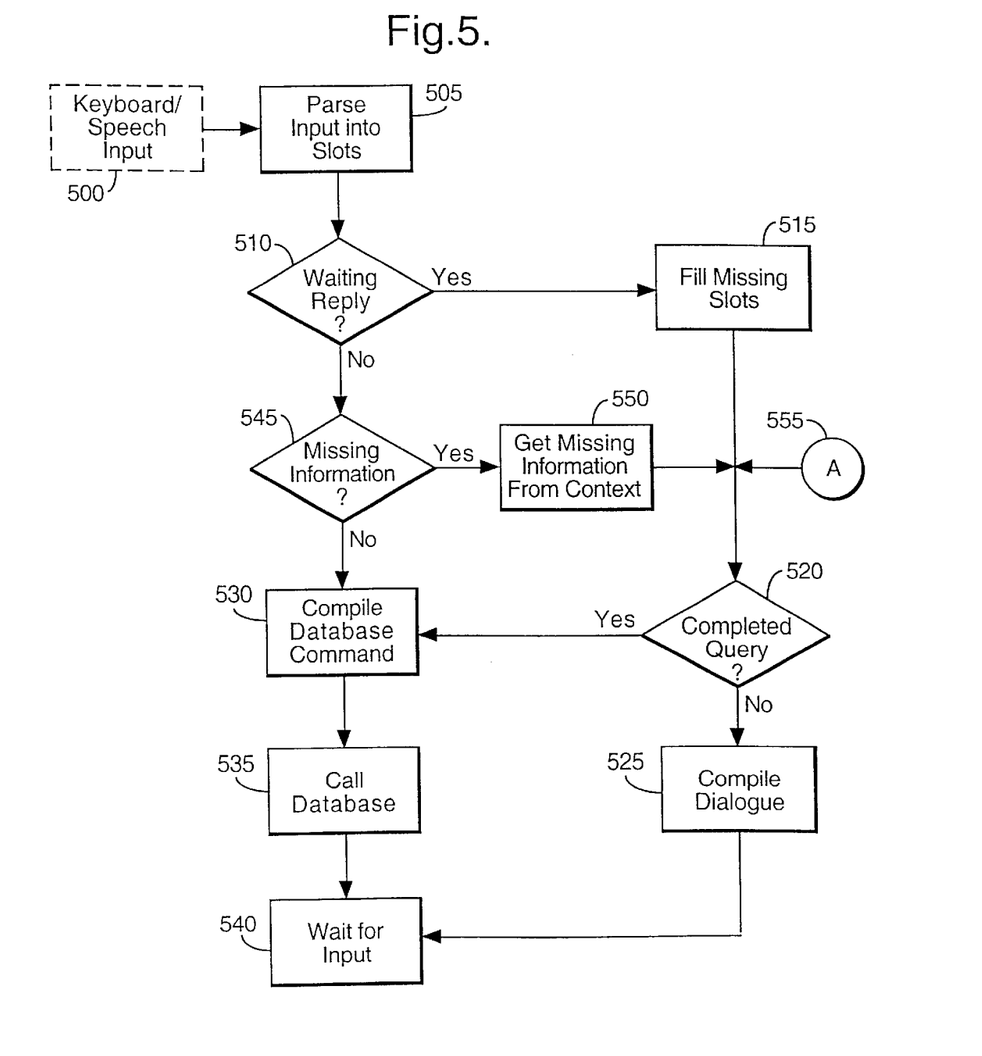
FIG. 5 shows a schematic flow diagram showing the processing of keyboard/speech inputs to the interface.

Referring to FIGS. 1 and 5, the overall operation of the reasoner 100 normally starts with a keyboard or speech input 500. The input goes to the fuzzy temporal reasoner 150 which time stamps the event and adds the event to the working memory. It also goes to the query pre-processor 155 which parses the input into slots to form the query which conforms to the system's pre-defined grammar. The constraint checking module 160 examines the contents of the slots, for instance, applying fuzzy matching principles (further described below under the heading "the fuzzy matcher") to remedy obvious typing errors.

There is a set of rules that specifies the slots that are required for an input. Where slots are empty, the reserved word "missing" is inserted. Where ambiguity cannot be resolved, or individual parts of the query do not satisfy constraints imposed by compatibility with querying the Dynamic Scheduler then the constraint checking module 160 will replace the ambiguous terms by reserved words such as "this" and "that". These reserved words are detectable by the system which is designed to take specific steps to resolve them. The new input 500 is now stored with any inserted reserved words and the query is passed to the wizard 165.

In step 510, the wizard 165 makes a check to see if the keyboard speech input 500 is actually in response to dialogue output to the user by the reasoner 100. The reasoner 100 may already be awaiting information to fill slots marked "missing" with an existing query.

If the wizard 165 detects that the reasoner 100 was already awaiting a reply to earlier dialogue, the content of the keyboard/speech input 500 is used to fill missing slots in an existing query, in step 515. The wizard 165 then checks whether the existing query has now been completed, at step 520 and, if not, resorts to dialogue with the user to obtain the missing information at step 525.

If the query has been completed at step 520, the wizard passes the query to the post-processing module 170 to convert the completed query into a database command for querying the database of the Dynamic Scheduler application, at step 530. The database command is output to the relevant application or database, at step 535, and the reasoner 100 returns to wait mode, to await the next user input, at step 540.

If the wizard 165 does not determine, at step 510, that the system is already awaiting a reply to dialogue with the user, the wizard 165 makes a check to see whether there are slots marked with reserved words in the query 500, at step 545. If there is missing information, there are two potential sources of information and the wizard 165 will check whether there is existing context data in the knowledge base or working memory 175 (step 550) and will also look for inputs received via the mouse or gaze system at step 555.

If there is no missing information at step 545, or if contextual data or mouse/gaze inputs have supplied the missing information such that a complete query is detected at step 520, the wizard 165 again triggers the post-processing module 170 to compile a database command at step 530.

In the process described above, if the wizard 165 has detected that the reasoner 100 is awaiting a reply at step 510, the wizard 165 only expects to fill missing slots in an existing query using information in the new keyboard/ speech input in response to dialogue with the user established at step 525. Clearly, it would be possible that the user's reply provided information which allowed a query to be completed from the contextual data at step 550, or a mouse/gaze input at step 555. An alternative to the process shown in FIG. 5 would therefore be that step 515, filling missing slots, should be followed by step 545, the check for missing information. This then allows contextual data to be used subsequent to dialogue with the user, at step 550.

The relevance of contextual data to a query is established mainly by the type of command. In the embodiment of the invention being described here, the context at any point in time is the object, attribute and command of the previous interaction. For example, for two sequential inputs 1 and 2:

| Context: | None |
|---|---|
| Input 1: | "Display the location of job 123" |
| Query: | Display the location of job 123 |
| Context: | Display the location of job 123 |
| Input 2: | "Job 234" |
| Query: | Display the location of job 234 |

It can be seen that contextual data has been used to complete the incomplete user input (Input 2).

Clearly, if the commands (usually the verb section of an input) change significantly, the context cannot be used. At any moment in time, the present query and the content are stored in the program.

Table 4 contains some examples of interactions with the reasoner 100 and how the reasoner responds. The "Query" column shows queries input by the user by keyboard or voice input and the "User Action" column shows sources the reasoner will look to in resolving ambiguities in the queries. These sources can be other user action, such as gaze direction with respect to the VDU, or can be existing contextual information in the knowledge base 175.

TABLE 4

Examples of Interactions with the Reasoner

| Query | User Action | Reasoning Process |
|---|---|---|
| show me technician ab123 job locations on the map | none | Complete query, process command and sent to application |
| tell me the duration of this job | mouse is clicked or eyes are focused on a job | this job is ambiguous it is resolved using focus context is updated |
| show me this of that technician | no focus context is technician ab123 end of day | two ambiguities context is used to solve ambiguities |
| read me this | no focus no context | everything is ambiguous the user is asked to repeat the missing parts the context is updated |

Taking the rows of table 4 in turn, the first query by the user involves text or speech input with no other action. The user requests the data visualiser to "show me technician ab123 job locations on the map". The reasoner 100 recognises the query as complete and converts it to a command compatible with the Dynamic Scheduler.

The second query, "tell me the duration of this job", is only partially complete as far as the text or speech input is concerned. The user takes the additional actions of clicking the mouse or focusing their eyes in relation to the particular job of interest, as shown on the VDU. The reasoner 100 recognises that "this job" is potentially ambiguous. It resolves the problem by looking at the focus of attention of the user, as demonstrated by the mouse click or by the focus of the eyes. The reasoner 100 can now interpret "this job" as the job the user is interested in and can send a complete command to the Dynamic Scheduler. Context information in the knowledge base 175 is updated to reflect the job the user referred to.

In the third query, "show me this of that technician", the reasoner 100 can recognise two ambiguities, "this" and "that technician". The reasoner 100 looks for the focus of attention of the user but there is no mouse click or detectable eye direction. The reasoner 100 looks to the current context or to the knowledge base 175 and is then able to interpret the two ambiguities as "end of day" and "technician ab 123".

The last query, "read me this", is not accompanied by any mouse click or detectable eye direction. Additionally, the reasoner 100 can find no context or data in the knowledge base 100. In this situation, the reasoner 100 resorts to dialogue with the user in order to complete the query. After successful dialogue, the contextual data in the knowledge base 175 can be updated.

FUZZY TEMPORAL REASONER 150

The following describes the functionality of the fuzzy temporal reasoner 150 in more detail. As mentioned above, the fuzzy temporal reasoner 150 is used to establish dependencies between inputs via the various modalities.

An event or a process is specified temporally by two parameters, start time, $t_s$ and end time, $t_e$.

Figure 6:
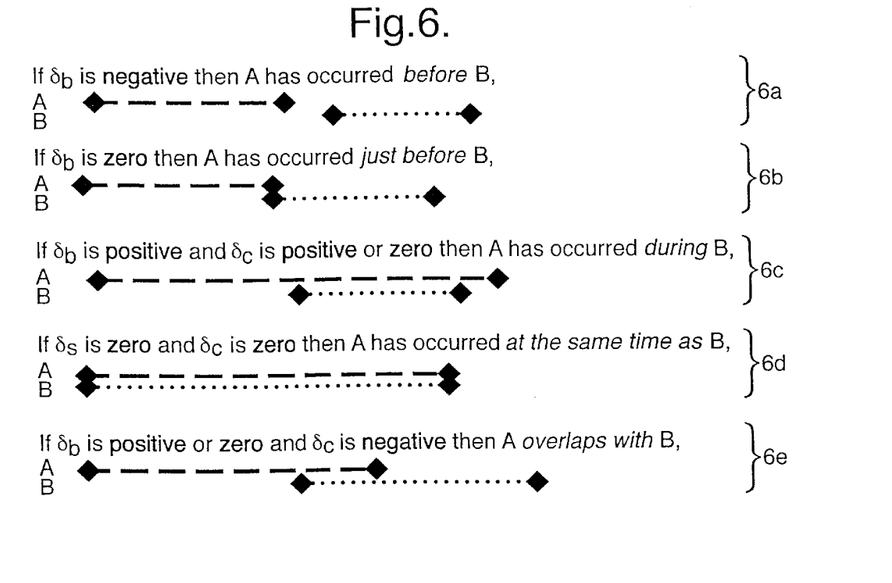
FIG. 6 shows a set of possible temporal relationships between events occurring in relation to the interface.

Referring to FIG. 6, let us take two events A and B with their associated parameters $t_{sA}$, $t_{eA}$, $t_{sB}$, $t_{eB}$. The temporal relationship between events A and B can be specified by three parameters $$\delta_s = t_{sA} - t_{sB}$$
$$\delta_e = t_{eA} - t_{eB}$$
$$\delta_b = t_{eA} - t_{sB}$$

With the assumption that A starts before or at the same time as B (i.e. $t_{sA} \leq t_{sB}$), there are a number of temporal relationships between A and B defined by the following rules:

If $\delta_b$ is negative then A has occurred before B (FIG. 6*a*),
If $\delta_b$ is zero then A has occurred just before B (FIG. 6*b*),
If $\delta_b$ is positive and $\delta_e$ is positive or zero then A has occurred during B (FIG. 6*c*),
If $\delta_s$ is zero and $\delta_e$ is zero then A has occurred at the same time as B (FIG. 6*d*),
If $\delta_b$ is positive or zero and $\delta_e$ is negative then A overlaps with B (FIG. 6*e*).

The temporal relationships are shown in italic.

Systems using conventional technology implement these rules based on the exact relationship between parameters of each event. When humans initiate the events, as is the case in embodiments of the present invention, events do not take place in strict order or in exact time slots. The kind of reasoning required in such cases is fuzzy rather than exact. For example the relationship between speech and gestures is better represented by fuzzy relationships. What is important in such circumstances is the closeness of two events rather than the exact relationship between them. This is precisely the capability that the fuzzy temporal reasoner 150 provides. The following is a description of various stages of the processes that take place in the temporal reasoner 150.

Figure 7:
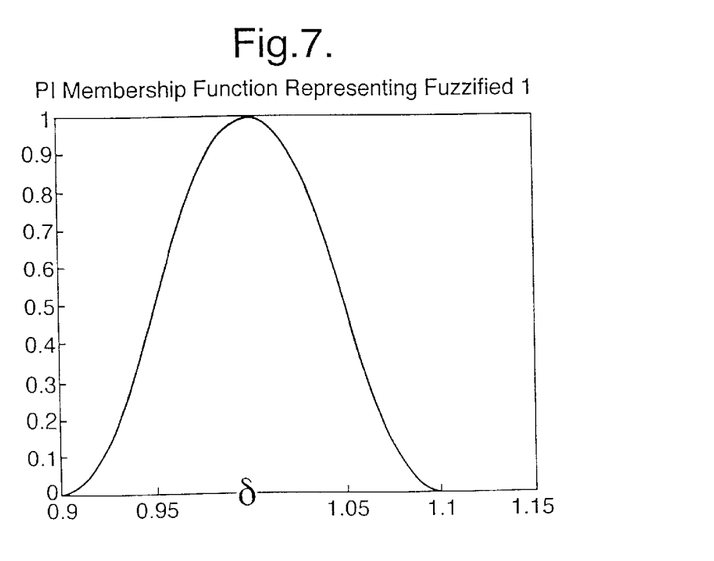
FIG. 7 shows a membership function for use in fuzzifying temporal relationships between events occurring in relation to the interface.

Referring to FIG. 7, first the temporal relationships ($\delta$'s) are fuzzified using a PI membership function as shown. A PI membership function is a known type of function that looks roughly like the Greek letter PI. It can be any function that starts from a low value, peaks in the middle and ends up around the same value as it started from.

Figure 8:
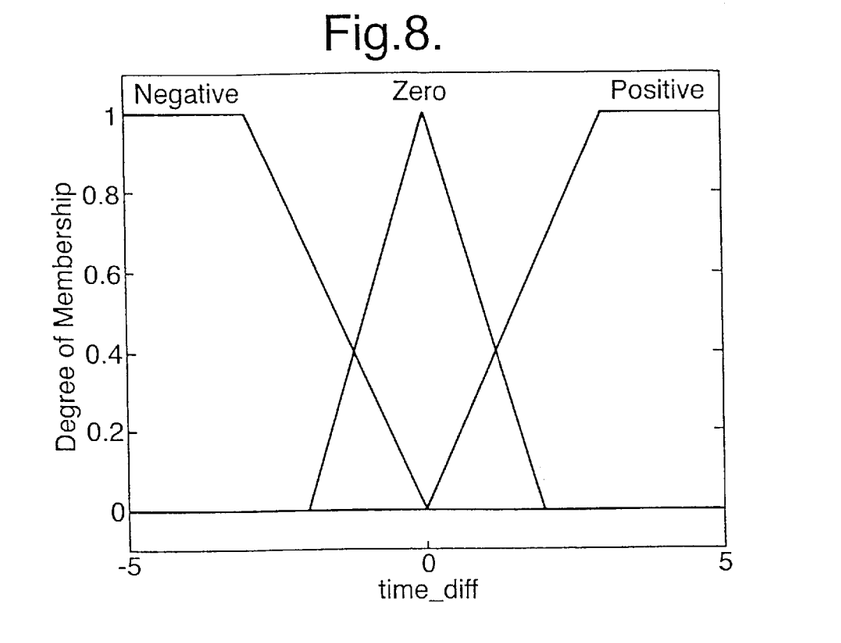
FIG. 8 shows fuzzy definitions for negative, zero and possible temporal relationships between events.

Referring to FIG. 8, the concepts of negative, zero and positive are then fuzzified as shown, to allow the implementation of the rules shown in FIG. 6.

Figure 9:
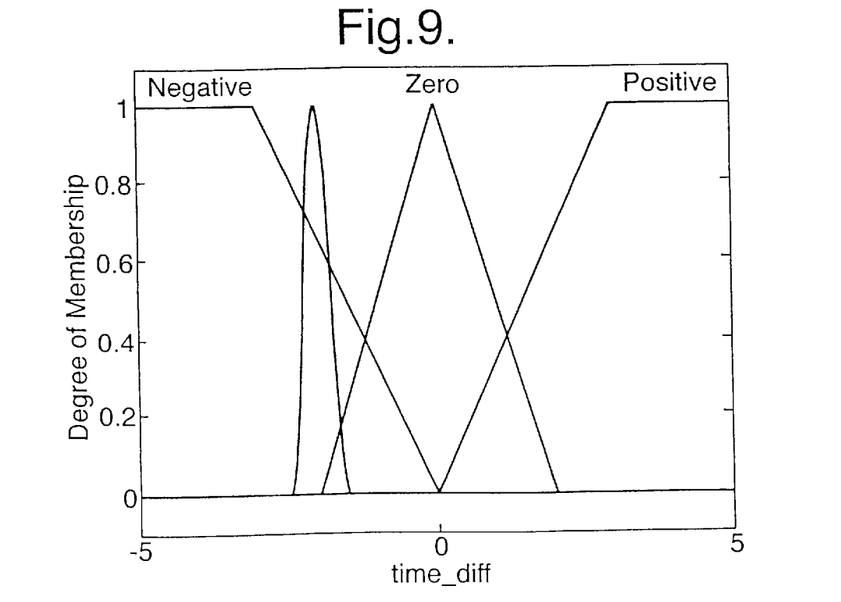
FIG. 9 shows mapping between fuzzy time differences and fuzzy relationships for use in analysing on receipt different events in relation to the interface.

Referring to FIG. 9, then the fuzzified $\delta$s are mapped onto the three regions shown in FIG. 8. If the time differences fall on any single region then the temporal relationships will be simply determined by a corresponding rule in the rule base for the fuzzy temporal reasoner 150 and an appropriate fact is inserted in the knowledge base 175. For example if $\delta_b$ is −20 then the following fact is inserted in the knowledge base by rule 1:

(A occurred before B).

However for the majority of cases there will be an overlap between the PI membership functions and the positive, zero or negative regions. For example if $\delta_b$ is −2 then there could be two rules which fire and produce two facts with different degrees (FIG. 9):

((A occurred before B) 0.7)
((A occurred just_before B) 0.3).

In such cases a fuzzy match is calculated which determines the degree to which the time differences belong to each region and the corresponding facts are added to the knowledge base with their associated fuzzy matching (0.7 and 0.3 in the above example). When all the facts have been accumulated defuzzification takes place. The principle here is that two events can only have one temporal a relationship (i.e. before, just before, during, overlapping or same time as) and therefore the relationship with the highest fuzzy match or certainty factor will be chosen as the most likely temporal relationship (e.g. (A occurred before B) in the previous example).

Concerning the fact ((A occurred just_before B) 0.3), the rule shown in FIG. 6*b* is the rule used to arrive at a "just before" relationship. The important point to note is that the reasoner is working with time differences between start and end of events and not start and end times directly. When two events occur, such as using the keyboard and the mouse, their start and end times are recorded. If the end time of the first event is before the start time of the second event then event one is before event 2. If they are equal we can say event 1 is just before event 2. The argument for fuzzifying this procedure is that there is no sharp boundary between before and just before. Within the context of multimodal interfaces there is no strict order in which events take place nor are there sharp boundaries for temporal categories.

Once they've been established, the wizard 165 can use the temporal categories in different ways. For example, it can determine whether the mouse was clicked on during a sentence, just before a word, or overlapping with a command. All these may be defined as indicating related inputs. The temporal categories can also be used to rank inputs, if there are several related inputs, as to which is the most probable source of correct data for formulating a correct command from unclear or incomplete inputs.

OTHER ASPECTS OF THE REASONER 100

The Grammar

The system is restricted to a limited number of uses. The actions that it is capable of are:

Creating a Schedule
Showing Information about a schedule
Altering parameters of the scheduler It can be seen then that the grammar is very simple.
A schema for the grammar is:

Command Object Attribute 1 Attribute 2
where attributes 1 and 2 may be omitted.

Because of the simple nature of this grammar (i.e. there are only four word classes) and the fact that there are very few words in the lexicon which belong to more than one possible class (in fact there are only three words which belong to more than one class) fully formed sentences are very easily parsed with no need to resort to the semantics of the sentence.

The four word classes are Command, Object, Attribute 1 and Attribute 2. These are effectively slots that every command must fill fully or partially. For example in the sentence "Display the start of day of technician 123" the sentence is first re-ordered into the form "Display technician 123 start of day" which is consistent with the four slot grammar and then each slot is assigned a value: Command: Display, Object: technician 123, Attribute 1: start of day, Attribute 2: None.

The parser has been implemented as a definite clause grammar in FRIL, a programming language developed by Jim Baldwin and Trevor Martin at Bristol University. It is a logic programming language similar to PROLOG with added capability for handling fuzzy and probabilistic facts.

Ellipsis and Deixis

Although it is relatively simple to construct a parser for fully formed sentences in the interface grammar, we want the human-computer interaction to be as natural as possible. This implies that the user should be able to speak to the interface as if s/he were addressing a human operator within the system. However, when we speak to other humans we often omit parts of the sentence, which we believe will be obvious to the other party. This linguistic phenomenon is known as ellipsis. An example for the interface might be:

Show me the chart for technician 557.
And for 559.

Here the user gives a full command for technician 557, but by only specifying the identification number of technician 559 indicates that s/he wants the same information for this technician.

Another problem is caused by "deixis". This is the use of the words "this" or "that" and their plurals.

Contexts for dealing with Ellipsis

If a sentence is under-specified, then it is reasonable to assume that those parts of the sentence which have not been uttered in fact refer to their last encountered instance. In the example given above we assume that the full command is:

Show me the chart for technician 559

This is based on the fact that the previous command and attribute were "show me" and "chart".

Consequently it is necessary to have a context which carries the last instance of each part of speech. This allows a complete sentence to be constructed in a legitimate and principled manner.

As described above, there is only a single context. However, it would clearly be possible to provide multiple contexts for differing situations.

This-Ness for multi-modality

The word "this" is used to specify which particular object we want to talk about. There are other connected uses but it is reasonable to assume that in the limited grammar of the interface these are not the intended use. For this interface there are two ways of identifying an object. Where there is a clear signal from one of the input modalities which isolates a particular object, we may assume that it is the particular object which is being referred to. In this case the message will come from the mouse or eye-gaze modalities. If on the other hand there is no clear message, then it can be assumed that "this" refers to the context.

The notion of a "clear" message, however, needs developing. There are three difficulties encountered with these modalities. Firstly, there is the strength of the message itself. Secondly, there is the time at which the message was received. Finally, it is necessary to decide which modality is sending the "this" message.

Strength of Message

In the case of the mouse the strength of the message is clear. The mouse is either clicked or not. Clicking a mouse is a clear signal. The only reason the user would do this would be if s/he wishes to send a signal. On the other hand, in the case of an eye-gaze system this is clearly not the case. For one thing the eye-gaze constantly moves around, so there is a need to cluster the actual position of the eye-gaze. More importantly for a large portion of the time the user will be looking at objects on the screen because s/he is extracting information from them. Of course if the user has maintained their gaze on an object for a long period of time then we can assume that this is the object which is being referred to and it is possible to set a period of time which will qualify as a positive input.

The Timing of the Message

The chief modalities are speech and keyboard input. Messages from these may include the word "this". However, the message containing the reference to it may come before or after the speech or keyboard input. This implies that some temporal reasoning will be necessary to decide which message is the appropriate one. Firstly, it is necessary to decide if a message is near enough to the time of the "this" to make it relevant. Secondly, it may be necessary to alter a decision if a more relevant message is received after the decision has been made. It is also important that the system does not "hang" i.e. that it does not wait for a further message unnecessarily.

These are time windows which can be set for use of embodiments of the present invention in specific circumstances.

Which Modality is Relevant

This is the final stage of the decision that combines all the information about the messages to make a decision. This decision must be based on the strength and timing of the message together with a priority order for messages. The priority order uses the fact that, while some messages are sent at regular intervals (e.g. eye-gaze), others are sent only intermittently (e.g. a mouse-click). Clearly, the intermittent modalities will be carrying a deliberate message, whereas regular modalities may or may not be relevant. Consequently, priority is given to the intermittent modalities. We can also say that once an intermittent modality message has been "fired" it can be discarded.

The Fuzzy Matcher

One problem often encountered with systems using a keyboard is typing errors. These are frustrating and often obvious to humans. Furthermore they slow down the use of the interface unnecessarily. The interface reasoner 100 has a system for attempting to match all typed words so that obvious typing errors are remedied.

The core of this module, which might be incorporated in the wizard 165, is the fuzzy matcher. This considers each word as having three properties:

The length of the Word: a word is similar to another word if it has a similar number of letters.

Common letters: a word is similar to another word if they share the same letters. This returns a similarity metric of the percentage of letters in the longer word that are also in the shorter word. For example "foo" and "fool" have a common letter similarity metric of 75%.

Letter Ordering: a word is similar to another word if the order of the letters is similar. For example "chat" and "chit" are similar because in both words "c" is followed by "h" and "t"; and "h" is followed by "t". Since there are 6 possible orderings and 3 of them are shared by both words, this metric makes them 50% similar.

The total similarity is defined in a somewhat ad hoc manner but it works well in practice. No word may be more than 1.5 times as long as a similar word. This is a simple binary decision. The final metric is then the sum of the common letters and letter ordering metrics divided by two. This is because the letter ordering metric gives lower similarity measures for smaller words.

The fuzzy matcher is then used within the definite clause grammar in order to (i) ensure only grammatically appropriate words are substituted for apparent misspellings and (ii) reduce the number of matchings that need to take place. The result can be very effective, but tends to make the system slow at parsing sentences.

Pro-activity and Adaptability

A further enhancement to a multi-modal interface is the ability to actively suggest future courses of action, or automatically undertake courses of action if appropriate. This mechanism has to be capable of adapting to individual users since each user might have individual ways of approaching a task. It also has to be relatively accurate in its prediction since inappropriate intervention on behalf of the system would become very annoying.

In a version of this enhancement, the human-interface interaction is considered as a system that moves from one action to another. If there are say seventy commands, then each of these can be considered a system state. Each time the user uses one command Si and then a second command Sj, then the probability of moving from Si to Sj is updated. If the probability of moving from one state to another is very high then the system can automatically move to this state. The probabilities are continually updated so adapting to the individual user's requirements.

The advantages of this are that (i) it adapts to the individual user (ii) it will only act if one successor state has a much higher probability than the others (iii) it provides a framework within which other modalities, such as facial expression recognition, could be incorporated.

The disadvantages are that bookkeeping costs are very high. If there are seventy possible states then there will be seventy probabilities to update after each command, which will entail updating distributions as well.

ENGINEERING ISSUES

The intelligent multi-modal interface has to support a number of input or output modalities to communicate with the user, particularly when the user queries the data visualiser as described above. To resolve ambiguity in user inputs, the reasoner exhibits intelligent behaviour in its particular domain.

Functional requirements of the interface include the ability to receive and process user input in various forms such as:

typed text from keyboard, hand-written text from a digitiser tablet or light pen, mouse movement or clicking, speech from a microphone, focus of attention of human eye captured by a camera, The system must also be able to generate output for the user using speech, graphics, and text.

In making the present invention, a modular approach has been taken in breaking down the required functionality into a number of sub-systems which are more easy to develop or for which software solutions already exist.

Another aspect of intelligent multi-modal systems is concurrency. The sub-systems of the reasoner must be running concurrently to process input which may come from more that one input modality (that is, mode) at the same time. For example the user may be talking to the machine while at the same time typing text, moving the mouse or gazing at different parts of the screen. The same applies to the output produced by the system. An animation may be displayed while at the same time a speech synthesis program could be running in parallel explaining this animation.

Modular and concurrent systems require some type of communication mechanism which enables the passing of the information between the various sub-systems or modules. It is an advantage to be able to configure the communications between the different modules easily. In this way, the system can be quickly adjusted to incorporate new and improved sub-systems (i.e. better speech recognition, eye tracking etc.).

Given the computational requirements of many of these sub-systems (vision processing, speech processing, reasoning, etc.), the distribution of the various modules to run over a network of computers instead of a single machine is also important. This distribution of the computation implies that the overall system must be able to run over heterogeneous hardware (e.g. UNIX workstations, PCs etc.).

To address these requirements, a software platform has been developed which merges existing software from different sources into a single package suitable for building experimental intelligent multi-modal systems. Next, we look into the different components of this platform.

Parallel Virtual Machine (PVM)

The core of the platform is the Parallel Virtual Machine (PVM) software developed at Emory University, Oak Ridge National Laboratory, and University of Tennessee. PVM is a software system that enables a collection of heterogeneous computers to be used as a coherent and flexible concurrent computational resource. The individual computers may be shared on local-memory multiprocessors, vector supercomputers, specialised graphics engines, or scalar workstations, that may be interconnected by a variety of networks, such as Ethernet, FDDI etc. User programs written in C, C++ or FORTRAN access PVM through library routines.

PVM uses sockets for inter-process communications but this mechanism is transparent to the user. PVM essentially provides a computational space where processes (i.e. programs) can run and communicate. In particular, processes can spawn other processes, send messages to other processes, broadcast a message to a group of processes or kill other processes. All these functions are very simple to perform in the PVM environment and become even simpler using the TkPVM extension to PVM to be discussed in the next section.

An effective monitor of the PVM engine is XPVM which runs under X window. The program provides a record of the events in the PVM engine, tracing messages between processes, debugging, monitoring of output from the different processes and various other facilities.

Tcl/Tk and TkPVM

Tcl is a simple and easy-to-use scripting language suitable for integrating systems and also for rapid prototyping and development. The language is currently supported by Sun Microsystems and seems to be gradually gaining wider acceptance in the computing community. The core of the language is a small compact Tcl interpreter written in C. The idea is to extend this basic interpreter with other C code or code in other computer languages which implements the complex data structures and functions of the particular application. These functions and data structures can then be grouped in a Tcl package which extends the basic set of commands of the Tcl interpreter with application-specific commands.

An example of such a package is the Tk toolkit used for rapid development of Graphical User Interfaces. The popularity of the Tk toolkit is one of the main reasons for the success of the Tcl language especially in the UNIX world.

Figure 10:
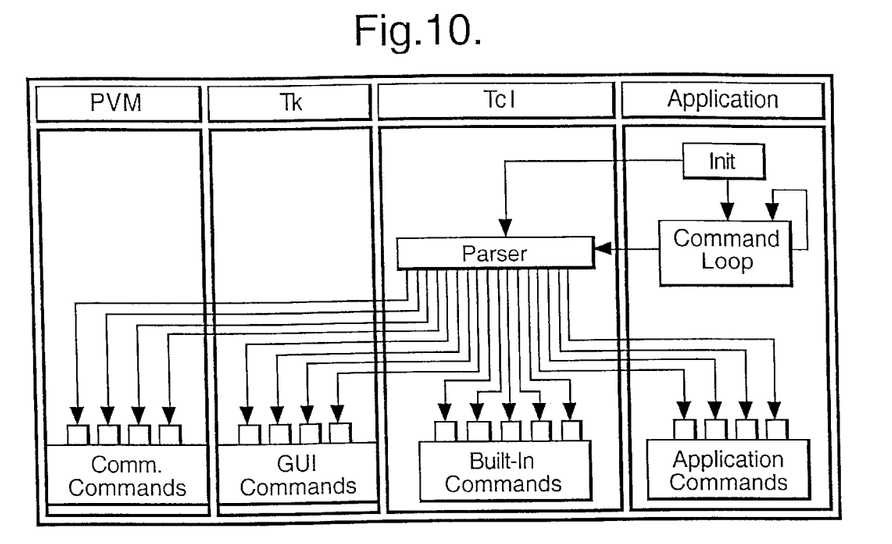
FIG. 10 shows an interpreter as part of the enabling technology for embodiments for the interface.

Apart from Tk, another useful package for Tcl is TkPVM developed by J. Nijtmans at NICI for the MIAMI Esprit project. TkPVM provides all the necessary functionality for using the PVM functions from within a Tcl script (i.e. Tcl program). The internal structure of the interpreter providing PVM, Tk, Tcl and application specific functionality is shown in FIG. 10.

Figure 11:
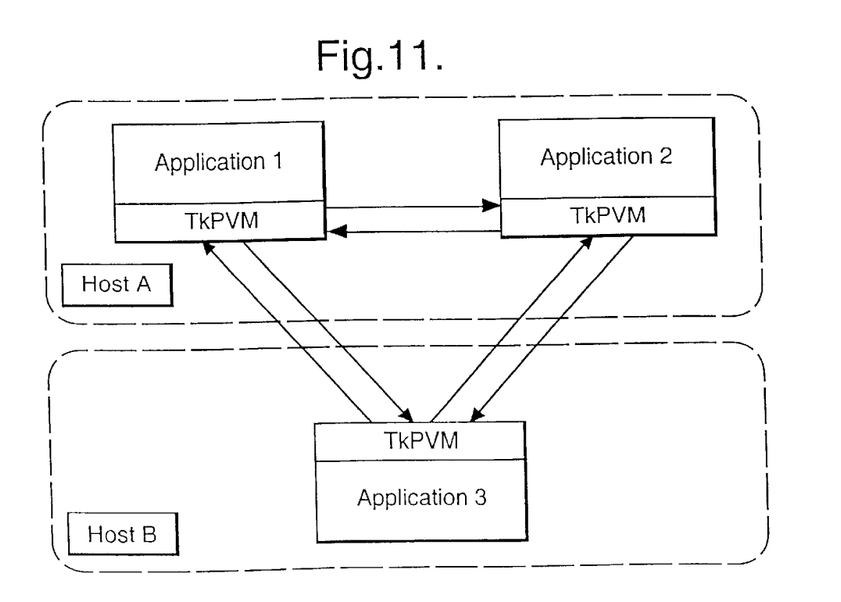
FIG. 11 shows schematically the relationship between software and hardware in a distributed embodiment of the interface.

Using TkPVM, Tcl scripts can be used as wrappers for applications to connect these applications to PVM. Furthermore, programs already written in Tcl\Tk can immediately make use of PVM and be part of the distributed system. An example of a distributed system based on PVM is illustrated in FIG. 11.

The Tcl/Tk/PVM interpreter mentioned above (see also FIG. 3) has been used to connect the different modules of Smart Work Manager (SWM). SWM is an intelligent multimodal system exploring the potential of using this type of technology for enhancing workforce scheduling tools. More information on the application can be found in earlier parts of this document. In here, we examine the different modules of the SWM system.

Most of these modules can be re-used in other applications and therefore they can be viewed as part of a greater software package including the Tcl/Tk/PVM interpreter together with specific modules particularly suited for developing prototype intelligent multi-modal systems.

Integrating The Modules of Smart Work Manager

Although alternative arrangements could be made, the following briefly describes preferred embodiments of modules for use with the reasoner 100.

STAP (Speech Recognition Software)

The STAP speech recogniser has been developed by British Telecommunications public limited company and it is based on HMM (Hidden Markov Models) technology. The package includes a speech recognition server and a client that can connect to this server using sockets. To use STAP with PVM, C-code was developed which provides a number of functions for connecting to a speech server, sending the speech input for recognition and receiving and processing the reply from the server. This C code has been integrated with the Tcl/Tk/PVM interpreter resulting in an enhanced interpreter which has built-in commands for communication with the speech recognition server.

Laureate (Speech Synthesis Software)

Laureate is a system also developed by British Telecommunications public limited company, for text-to-speech conversion. The version of Laureate used consisted of a number of executable programs for initialising Laureate and processing the results. To integrate Laureate with the rest of the system, a UNIX script was used to wrap around Laureate. Given a string as input, it invokes the necessary laureate commands for producing speech output which is subsequently send to an audio device of the machine for reproduction. In addition to that, a PVM process was developed in Tcl/Tk which uses the Tcl/Tk/PVM interpreter. This process can receive messages from other PVM processes and then invoke the Laureate script with the appropriate input to play the message.

Reasoner (in FuzzyCLIPS)

CLIPS is an expert system shell developed by NASA. The system supports many software paradigms in a single platform including object-oriented, rule-based, and procedural programming. The reasoner module has been developed in an extension of CLIPS called FuzzyCLIPS.

CLIPS can be used as stand-alone or embedded in an another application. Given the fact that the reasoner has to communicate with other PVM processes, an enhanced Tcl/Tk/PVM interpreter was used, with the CLIPS system embedded in it. This enhanced interpreter provides build in commands for loading a file in CLIPS, running the inference engine, asserting facts in the CLIPS memory etc. In addition to that, the CLIPS system was extended with functions for sending messages from within the CLIPS environment to another PVM process.

Gaze System (written in C)

PVM can be integrated particularly easily if the gaze-tracking system used is written in C.

Dynamic Scheduler (written in C and Tcl/Tk)

The Dynamic Scheduler was written in C (scheduler part) and tcl/tk(visualisation part). The integration of Dynamic Scheduler with the rest of the system was again therefore relatively easy because part of the system already written in the Tcl/Tk language.

Speech Recogniser

A speech recogniser suitable for use in embodiments of the present invention is described in "Speech Recognition—Making it Work for Real", F Scahill, J E Talityre, S H Johnson, A E Bass, J A Lear, D J Franklin and P R Lee, BT Technology Journal, Vol. No. 1, January 1996, pp. 151–164.

Overall Architecture (written in Tcl/Tk)

Figure 12:
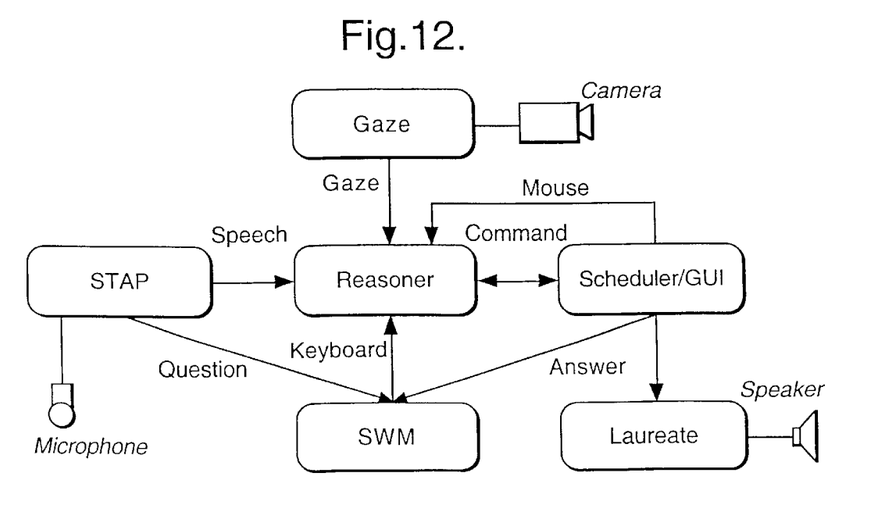
FIG. 12 shows schematically an architecture for the software modules of the interface, including communications routes.

Referring to FIG. 12, the architecture shows the main module of the system which spawns all the other modules. The user can type questions, correct questions poorly recognised, get answers in text, and see the dialogue history. FIG. 12 shows the overall architecture of the system (Smart Work Manager) with the various modules and the communications between them.

Various changes can be made in a system as described above without departing from the spirit of the present invention. For instance:

- The context can be extended to have a tree like structure such that the user is able to make reference to previously used contexts.
- The temporal reasoner can be used more extensively in conflict resolution.
- The grammar can be extended to include multiple format grammars.
- The dialogue system can be improved to become more user friendly.
- Different approaches can be used for resolving ambiguities such as competition between modalities or bidding.

What is claimed is:

1. A multimodal user interface for receiving user inputs to a computer based system in more than one different mode, the interface comprising:
   an input for receiving user communications in any one of at least two different modes;
   processing means for performing the following:
      measuring start and end times of at least two received user communications;
      calculating temporal separation between combinations of the measured start times and the measured end times;
      identifying a command for use in controlling the computer based system;
      applying a broadening function (PI) to at least some of said calculated temporal separations; and
      applying one or more rules in order to categorize the broadened temporal separations, wherein each category identifies a type of relationship between the received user communications, and the identified relationship is used to generate said command.

2. A multimodal user interface according to claim 1, wherein said input means is adapted to receive user communications in any two or more of the following modes: text, speech, spatial indicator and screen-based cursor.

3. A multimodal user interface according to claim 1, wherein the processing means comprises timing means for detecting receipt times associated with received user communications, for use in detecting related inputs.

4. A multimodal user interface according to claim 1, which further comprises a context database, and means to store data from received user communications in the context database, said processing means being adapted to refer to the context database for data for use in formulating a command.

5. A multimodal user interface according to claim 1, further comprising means for ranking the received input so as to identify a most probable source of the user communications.

6. A multimodal user interface according to claim 3, further including means for analyzing received user communications in accordance with configurable time windows, the means for analyzing being arranged to receive input from the timing means and being operable to determine relevance of a user communication to at least one of a demonstrative word and phrase in dependence on the temporal relationship between at least one of time of receipt of said demonstrative word and phrase and time of receipt of the received user input.

7. A multimodal user interface according to claim 1, wherein the input means is further arranged to categorize received user communications into one of an intermittent mode and a regular mode, and further comprising means for assigning higher priority to received user communications of the intermittent mode type than to those of the regular mode type.

8. A method of utilizing user inputs to identify a command for a computer based system, the method comprising:
   receiving input user communications in any one of at least two different modes;
   measuring start and end times of at least two received user communications;
   calculating temporal separation between combinations of the measured start times and the measured end times;
   identifying a command for use in controlling the computer based system;
   applying a broadening function to at least some of said calculated temporal separations; and
   applying one or more rules in order to categorize the broadened temporal separations wherein each category identifies a type of relationship between the received user communications, and the identified relationship is used to generate said command.

9. A method according to claim 8, further comprising ranking the received input so as to identify a most probable source of the user communications.

10. A method according to claim 8, further comprising determining relevance of a user communication to at least one of a demonstrative word and a phrase in dependence on the temporal relationship between time of receipt of said at least one of demonstrative word and phrase and time of receipt of the received user input.

11. A method according to claim 10, further comprising categorizing received user communications into one of an intermittent mode and a regular mode and assigning higher priority to received user communications of the intermittent mode type than to those of the regular mode type.

* * * * *